(12) United States Patent
Yamashita (10) Patent No.: US 8,463,321 B2
(45) Date of Patent: Jun. 11, 2013

(54) MOBILE INFORMATION TERMINAL (75) Inventor: Reiko Yamashita, Gifu (JP)

(73) Assignee: KYOCERA Corporation, Kyoto (JP)

( * ) Notice: Subject to any disclaimer, the term of this patent is extended or adjusted under 35 U.S.C. 154(b) by 334 days.

(21) Appl. No.: 12/863,170

(22) PCT Filed: Jan. 16, 2009

(86) PCT No.: PCT/JP2009/050525
§ 371 (c)(1),
(2), (4) Date: Jul. 15, 2010

(87) PCT Pub. No.: WO2009/091024
PCT Pub. Date: Jul. 23, 2009

(65) Prior Publication Data
US 2011/0053665 A1 Mar. 3, 2011

(30) Foreign Application Priority Data
Jan. 18, 2008 (JP) ................................ 2008-009918

(51) Int. Cl.
H04M 1/00 (2006.01)
(52) U.S. Cl.
USPC .................................... 455/556.1; 455/575.2
(58) Field of Classification Search
USPC ................. 455/575.2, 575.3, 556.1
See application file for complete search history.

(56) References Cited

U.S. PATENT DOCUMENTS

| | | |
|---|---|---|
| 2001/0031049 A1 | 10/2001 | Kupiainen |
| 2001/0055980 A1 | 12/2001 | Sato |
| 2005/0208799 A1 | 9/2005 | Oda |
| 2006/0135226 A1* | 6/2006 | Won et al. .................. 455/575.3 |
| 2007/0049356 A1 | 3/2007 | Jung et al. |
| 2007/0287471 A1 | 12/2007 | Wood |

FOREIGN PATENT DOCUMENTS

| | | |
|---|---|---|
| EP | 0472361 | 2/1992 |
| EP | 0472361 A2 | 2/1992 |
| JP | 11-028470 | 2/1999 |

(Continued)

OTHER PUBLICATIONS

Notice of Decision to Grant a Patent dated Aug. 12, 2011, issued for counterpart Korean Patent Application No. 2010-7018191.

(Continued)

Primary Examiner — Tu X Nguyen
(74) Attorney, Agent, or Firm — Procopio, Cory, Hargreaves & Savitch LLP (57) ABSTRACT To provide a mobile information terminal that facilitates an operation of switching communication methods, the mobile terminal includes a first housing, a second housing connected to the first housing in a relatively movable manner, a status detecting portion, a WiMAX communication portion, a CDMA communication portion, and a mode switching portion. The second housing has a first part and a second part on its surface facing the first housing. The mobile terminal can be changed in status to a data communication style in which the first part is exposed and to a voice call style in which the second part is exposed. The status detecting portion detects whether the mobile terminal is in the data communication style or in the voice call style (S03). The mode switching portion switches the communication mode, on the basis of the status detected by the status detecting portion (S05, S21), to either a data communication mode in which communication is performed using the WiMAX communication portion, or a CDMA communication mode in which communication is performed using the CDMA communication portion (S10, S22).

3 Claims, 9 Drawing Sheets

FOREIGN PATENT DOCUMENTS

| | | |
|---|---|---|
| JP | 2000-503497 A | 3/2000 |
| JP | 2001-345731 | 12/2001 |
| JP | 2002-084351 | 3/2002 |
| JP | 2002-112333 | 4/2002 |
| JP | 2005-159965 | 6/2005 |
| JP | 2005-277468 | 6/2005 |
| JP | 2005-348443 | 12/2005 |
| JP | 2006-180530 | 7/2006 |
| JP | 2007-068175 | 3/2007 |
| KR | 2006-0088304 A | 8/2006 |

OTHER PUBLICATIONS

Notice of Ground of Rejection dated Jan. 15, 2013, issued in counterpart Japanese Application No. 2008-009918.

* cited by examiner

FIRST MENU

1. BROWSER
2. E-MAIL
3. STREAMING
4. VoIP PHONE

FIG. 8B

SECOND MENU

1. BROWSER
2. E-MAIL
3. STREAMING

MOBILE INFORMATION TERMINAL

TECHNICAL FIELD

The present invention relates to a mobile information terminal, and more particularly to a mobile information terminal which can communicate in a plurality of communication methods.

BACKGROUND ART

A mobile information terminal is able to execute a plurality of application programs. Thus, in order to specify an application program to be executed in the mobile information terminal, one of the plurality of application programs needs to be selected.

For example, a mobile information terminal is known which facilitates selection of an application program to be executed. This mobile information terminal includes: a first unit; a second unit; engaging portion to engage the second unit with the first unit in a slidable manner; locking portion to lock, within a slidable range, the second unit being slid by the engaging portion; position detecting portion to detect a position at which the second unit has been locked by the locking portion; and function control portion to start a predetermined function in accordance with the locked position detected by the position detecting portion.

Meanwhile, some mobile information terminals are able to communicate in two types of communication methods: a communication method such as CDMA (code division multiple access), and a communication method for a wireless LAN (local area network) such as WiMAX (worldwide interoperability for microwave access). Furthermore, in some mobile information terminals, both of voice communication for performing a voice call and data communication for transmitting/receiving data are possible in each of the CDMA type communication method and the WiMAX type communication method. In this case, it is necessary for a user to select one of the two types of communication methods for switching the communication methods.

Some application programs executed by a mobile information terminal employ voice communication or data communication. For a certain application program, using one of the two types of communication methods may be more advantageous than using the other, in terms of cost and efficiency including the communication speed. A user may not be able to select a suitable communication method if the user does not know which one of the two types of communication methods is suitable for each application program to be executed by the mobile information terminal.

DISCLOSURE OF THE INVENTION

Problems to be Solved by the Invention

The present invention has been accomplished to solve the above-described problems, and an object of the present invention is to provide a mobile information terminal which facilitates an operation of switching the communication methods.

Means for Solving the Problems

To achieve the above-described object, according to an aspect of the present invention, a mobile information terminal includes: a first housing; a second housing connected to the first housing in a relatively movable manner, the second housing having a first part and a second part on its surface facing the first housing, the mobile information terminal being changeable in status to a first status in which the first part is exposed to the outside and to a second status in which the second part is exposed to the outside; status detecting portion to detect whether the mobile information terminal is in the first status or the second status; first communication portion; second communication portion different in communication method from the first communication portion; and mode switching portion to switch a communication mode, on the basis of the status detected by the status detecting portion, to either a first communication mode in which communication is performed using the first communication portion or a second communication mode in which communication is performed using the second communication portion.

DESCRIPTION OF THE REFERENCE CHARACTERS

1: mobile information terminal; 11: speaker; 13: microphone; 14: operation keys; 15: LCD; 16: connection terminal; 16A: earphone microphone; 17: four-way navigation key; 18: power switch; 21: CPU; 22: WiMAX communication portion; 23: CDMA communication portion; 24: first switch; 25: second switch; 26: vibration portion; 27: card I/F; 27A: memory card; 28: codec portion; 29: voice switching portion; 30: display control portion; 31: flash ROM; 32: RAM; 40A: first housing; 40B: second housing; 41: first part; and 42: second part.

BEST MODES FOR CARRYING OUT THE INVENTION

Embodiments of the present invention will now be described with reference to the drawings. In the following description, like reference characters denote like parts, which have like names and functions, and therefore, detailed description thereof will not be repeated.

Figure 1:
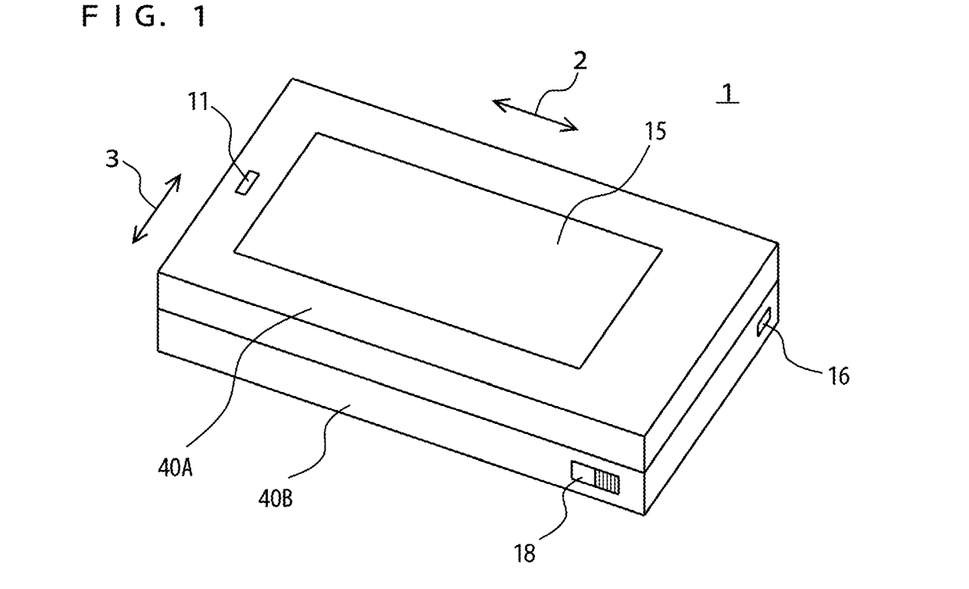
FIG. 1 is a perspective view of a mobile information terminal in a primary style.
Figure 2:
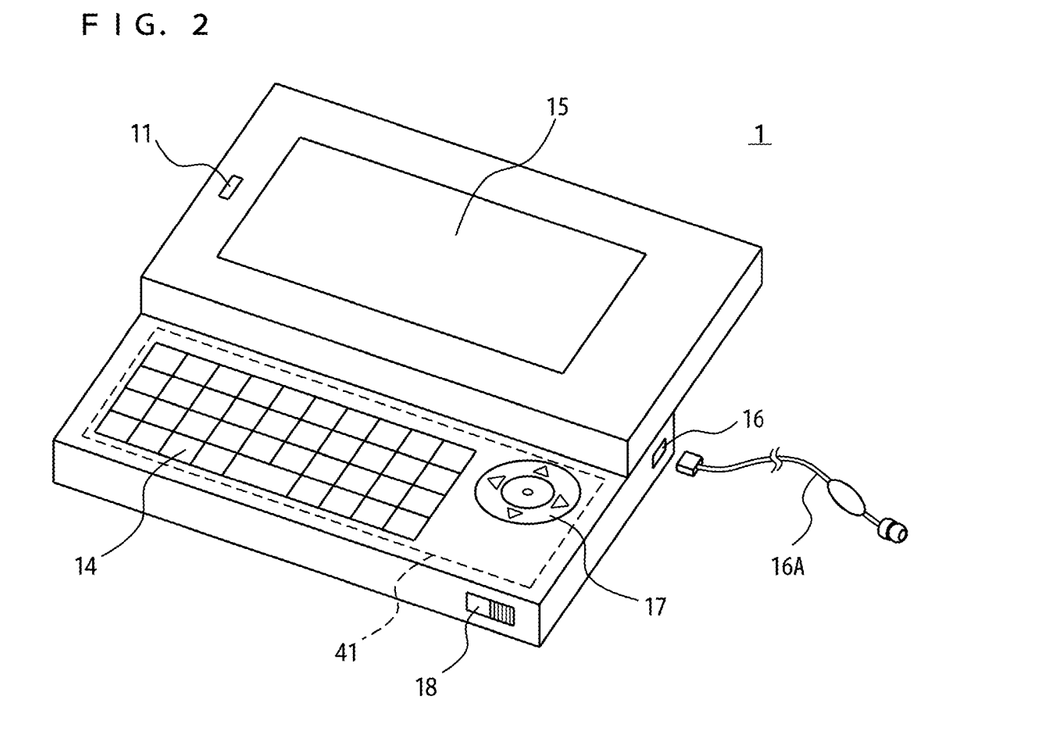
FIG. 2 is a perspective view of the mobile information terminal in a data communication style.
Figure 3:
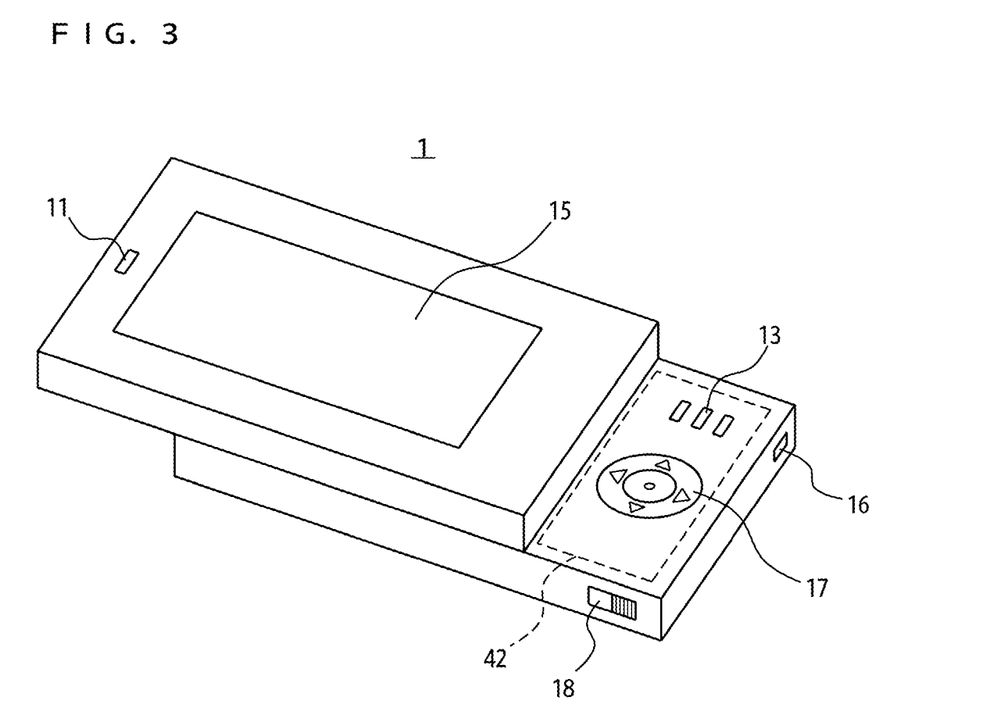
FIG. 3 is a perspective view of the mobile information terminal in a voice call style.

FIGS. 1 to 3 are perspective views, in different styles, of a mobile information terminal 1 according to an embodiment. FIG. 1 is the perspective view of mobile information terminal 1 in a primary style. FIG. 2 is the perspective view of mobile information terminal 1 in a data communication style. FIG. 3 is the perspective view of mobile information terminal 1 in a voice call style. The data communication style is an example of a first status, and the voice call style is an example of a second status.

Referring to FIGS. 1 to 3, mobile information terminal 1 includes a first housing 40A and a second housing 40B. First housing 40A and second housing 40B are connected in such a manner that they can move relative to each other. In the primary style, mobile information terminal 1 has an approximately rectangular parallelepiped shape, with first housing 40A overlying second housing 40B. In the state where mobile information terminal 1 is in the primary style, when first housing 40A slides over second housing 40B in parallel with a plane where first housing 40A overlies second housing 40B and in a lateral direction shown by an arrow 3 in FIG. 1, mobile information terminal 1 is transformed into the data communication style shown in FIG. 2. In the primary style, when first housing 40A slides over second housing 40B in parallel with the plane where first housing 40A overlies second housing 40B and in a longitudinal direction shown by an arrow 2 in FIG. 1, mobile information terminal 1 is transformed into the voice call style shown in FIG. 3.

First housing 40A includes, on its surface opposite to its other surface facing second housing 40B, a speaker 11 which serves as a receiver and a liquid crystal display (LCD) 15. Second housing 40B includes, on its surface facing first housing 40A, operation keys 14 constituting a full keyboard, a four-way navigation key 17, and a microphone 13, and on its sides, a connection terminal 16 into which an earphone microphone may be connected, and a power switch 18. Operation keys 14 include a plurality of keys to which alphanumeric, kana, and katakana characters have been assigned, and a plurality of keys to which function keys have been assigned. A user may operate operation keys 14 to input characters, symbols, and the like.

Four-way navigation key 17 has four switches located on the left, right, top and bottom sides thereof and an enter key located at the center of these switches. Four-way navigation key 17 accepts an operation of moving a pointer displayed on LCD 15, or an operation of selecting a menu item displayed on LCD 15.

Referring to FIG. 1, in mobile information terminal 1 in the primary style, the surface of second housing 40B facing first housing 40A is covered by first housing 40A and, thus, is hidden from the outside.

Referring to FIG. 2, in mobile information terminal 1 in the data communication style, a first part 41 which is part of the surface of second housing 40B facing first housing 40A is exposed to the outside. First part 41 includes operation keys 14 and four-way navigation key 17. Therefore, the data communication style is suitable for a character entry intensive task, such as editing of e-mail. In mobile information terminal 1 in the data communication style, microphone 13 included in second housing 40B is covered by first housing 40A, hindering input of voice into mobile information terminal 1. When a microphone earphone 16A is inserted into connection terminal 16, however, voice can be input into mobile information terminal 1 through microphone earphone 16A that is connected to mobile information terminal 1.

Referring to FIG. 3, in mobile information terminal 1 in the voice call style, a second part 42 which is part of the surface of second housing 40B facing first housing 40A is exposed to the outside. Second part 42 includes microphone 13 and four-way navigation key 17. That is, first part 41 and second part 42 overlap one another, both including four-way navigation key 17. Meanwhile, speaker 11 included in first housing 40A is exposed to the outside. Thus, in mobile information terminal 1 in the voice call style, voice can be not only output from speaker 11 but also input through microphone 13. Therefore, the voice call style is suitable for a telephone conversation.

Figure 4:
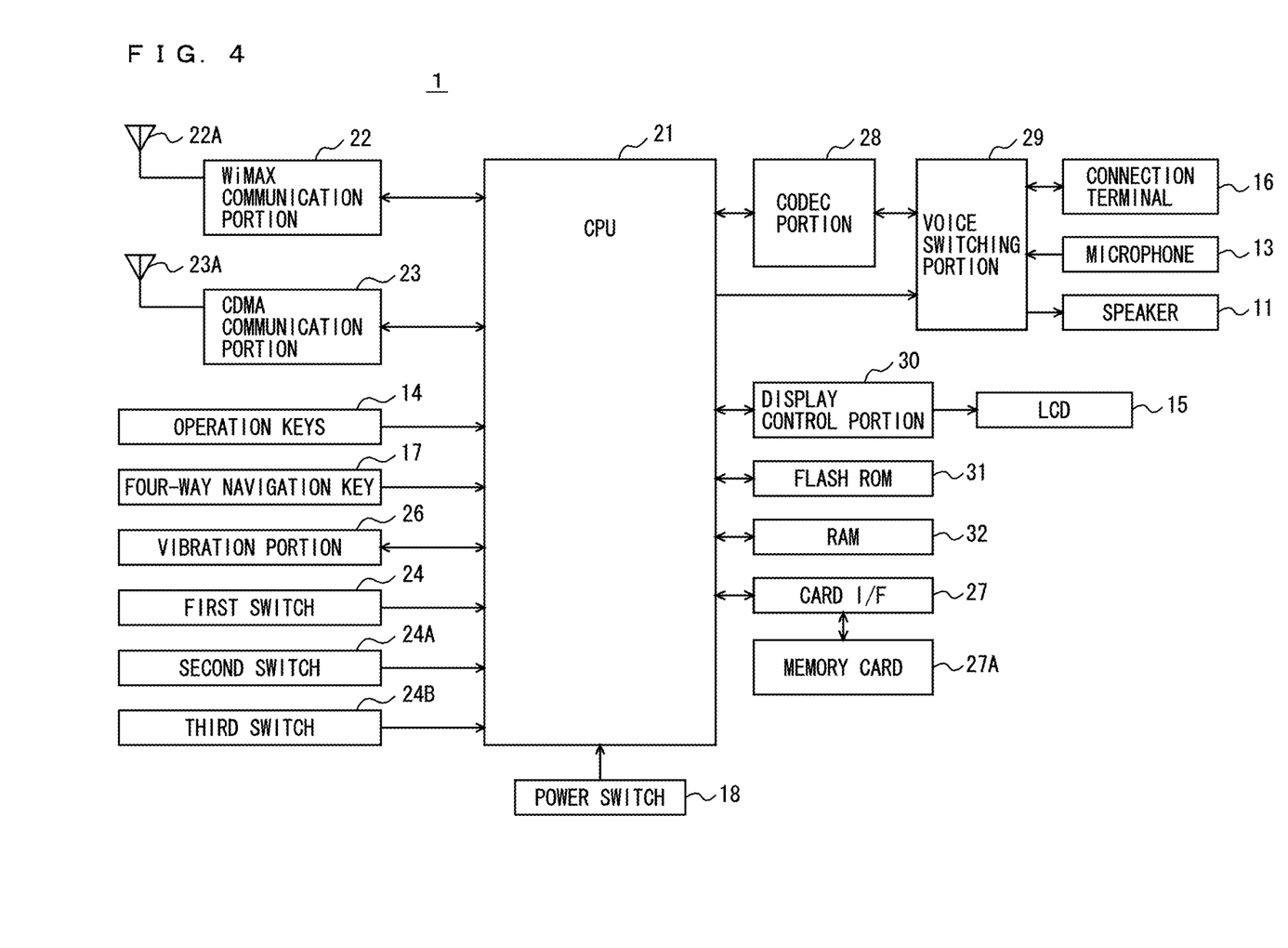
FIG. 4 is a functional block diagram schematically showing the hardware configuration of the mobile information terminal.

FIG. 4 is a functional block diagram schematically showing the hardware configuration of mobile information terminal 1 according to the present embodiment. Referring to FIG. 4, mobile information terminal 1 includes: a CPU 21 which is responsible for overall control of mobile information terminal 1; a WiMAX communication portion 22 connected to an antenna 22A; a CDMA communication portion 23 connected to an antenna 23A; a codec portion 28 for processing voice data; a voice switching portion 29 for switching input/output of codec portion 28; microphone 13, speaker 11, and connection terminal 16 which are each connected to voice switching portion 29; operation keys 14 and four-way navigation key 17 which accept an input of an operation by a user; a vibration portion 26; a first switch 24; a second switch 24A; a third switch 24B; power switch 18; a display control portion 30 for controlling display on LCD 15; a flash read only memory (ROM) 31 for storing, among others, a program to be executed by CPU 21 (including e-mail and address book data); a random access memory (RAM) 32 used as a work area for CPU 21; and a card interface (I/F) 27.

WiMAX communication portion 22 is controlled by CPU 21 to be connected to a network that uses a WiMAX communication method. The WiMAX communication method, also called a Wireless MAN (metropolitan area network), is the IEEE802.16 standard that provides high-speed wireless communication to a metropolitan area. Specifically, WiMAX communication portion 22 performs wireless communication with an access point connected to the WiMAX network. A radio signal transmitted from the access point is received at antenna 22A. WiMAX communication portion 22 receives the radio signal which was received at antenna 22A, and outputs a signal obtained by demodulating the radio signal, to CPU 21. When receiving a transmitting signal from CPU 21, WiMAX communication portion 22 outputs a radio signal obtained by modulating the signal, to antenna 22A. The radio signal transmitted from antenna 22A is received at the access point. The WiMAX communication method is suitable for data communication because it uses TCP/IP (transmission control protocol/internet protocol) as the communication protocol. The WiMAX communication method has a higher transfer rate and a lower communication cost than those of the CDMA communication method. Therefore, the WiMAX communication method is suitable for data-intensive communications, such as streaming, browsing, and the like.

While WiMAX communication portion 22 is connected to the WiMAX network in this example, the network is not limited to the WiMAX network; it may be any type of wireless LAN, such as BLUETOOTH (registered trademark), WiFi (registered trademark), or the like.

CDMA communication portion 23 is controlled by CPU 21 to be connected to a network that uses a CDMA communication method. Specifically, CDMA communication portion 23 performs wireless communication with a base-station device connected to a CDMA network. A radio signal transmitted from the base-station device is received at antenna 23A. CDMA communication portion 23 receives the radio signal which was received at antenna 23A, and outputs a signal obtained by demodulating the radio signal, to CPU 21. When the signal obtained through demodulation of the radio signal is an audio signal, CPU 21 outputs the audio signal to codec portion 28.

When receiving a signal from CPU 21, CDMA communication portion 23 output a radio signal obtained by modulating the signal, to antenna 23A. When receiving an audio signal from codec portion 28, CPU 21 outputs the audio signal to CDMA communication portion 23. The radio signal transmitted from antenna 23A is received at and input into the CDMA base-station device. The CDMA communication method is suitable for communications in which voice is transmitted and received.

While CDMA communication portion 23 is connected to the CDMA network in this example, the network may be, e.g., a PDC (personal digital cellular) network, a GSM (global system for mobile) network, a W-CDMA (wideband code division multiple access) network, or a PHS (personal handyphone system) network.

Codec portion 28 decodes an audio signal input from WiMAX communication portion 22 or CDMA communication portion 23, converts the decoded digital audio signal into an analog signal, amplifies the same, and outputs the resultant signal to voice switching portion 29. When receiving an analog audio signal from microphone 13 or connection terminal 16 via voice switching portion 29, codec portion 28 converts the analog audio signal into a digital signal, codes the same, and outputs the coded audio signal to WiMAX communication portion 22 or CDMA communication portion 23.

Voice switching portion 29 is controlled by CPU 21 to switch input/output of an audio signal to/from codec portion 28. Voice switching portion 29 outputs an audio signal accepted from codec portion 28 to either connection terminal 16 or speaker 11. When earphone microphone 16A is connected to connection terminal 16, voice switching portion 29 outputs the audio signal accepted from codec portion 28 to connection terminal 16. When earphone microphone 16A is not connected to connection terminal 16, voice switching portion 29 outputs the audio signal accepted from codec portion 28 to speaker 11.

Voice switching portion 29 outputs an audio signal output from either microphone 13 or connection terminal 16 to codec portion 28. When earphone microphone 16A is connected to connection terminal 16, voice switching portion 29 outputs the audio signal accepted from connection terminal 16 to codec portion 28. When earphone microphone 16A is not connected to connection terminal 16, voice switching portion 29 outputs the audio signal accepted from microphone 13 to codec portion 28.

Display control portion 30 is controlled by CPU 21. Display control portion 30 controls LCD 15 in accordance with an instruction input from CPU 21, to cause LCD 15 to display an operation screen or an image. The image displayed on LCD 15 includes moving and still images.

Vibration portion 26 is controlled by CPU 21 to generate vibrations by rotating a vibration plate which is fixedly secured to a motor shaft at a position offset from the center of gravity. For example, when wireless circuit 22 or wireless LAN circuit 23 receives an incoming signal, CPU 21 drives vibration portion 26 so as to provide incoming call vibration alert.

First switch 24 is connected to CPU 21. First switch 24 is ON when mobile information terminal 1 is in the data communication style, and OFF when mobile information terminal 1 is in a style other than the data communication style. Second switch 24A is also connected to CPU 21. Second switch 24A is ON when mobile information terminal 1 is in the voice call style, and OFF when mobile information terminal 1 is in a style other than the voice call style. Third switch 24B is also connected to CPU 21. Third switch 24B is ON when mobile information terminal 1 is in the primary style, and OFF when mobile information terminal 1 is in a style other than the primary style.

Card I/F 27 is mounted with a removable memory card 27A. Memory card 27A may be, e.g., a CompactFlash, a SmartMedia (registered trademark), a secure digital (SD) memory card, a memory stick, a multimedia card (MMC), an xD picture card, or the like.

CPU 21 is capable of accessing memory card 27A via card I/F 27. While it is here assumed that the program to be executed by CPU 21 is stored in flash ROM 31 in advance, the program may be stored in memory card 27A and read from memory card 27A for execution by CPU 21. The recording medium for storing the program is not restricted to memory card 27A. It may be a flexible disk, a cassette tape, a magnetic disk, an optical disk (compact disc-ROM (CD-ROM), magnetic optical disc (MO), mini disc (MD), digital versatile disc (DVD)), an optical card, or a semiconductor memory such as a mask ROM, an EPROM, or the like. Still alternatively, mobile information terminal 1 may be connected to the Internet via WiMAX communication portion 22 and the program may be downloaded from a computer connected to the Internet, to be executed by CPU 21. As used herein, the "program" includes, not only the program directly executable by CPU 21, but also a source program, a compressed program, an encrypted program, and others.

Figure 5:
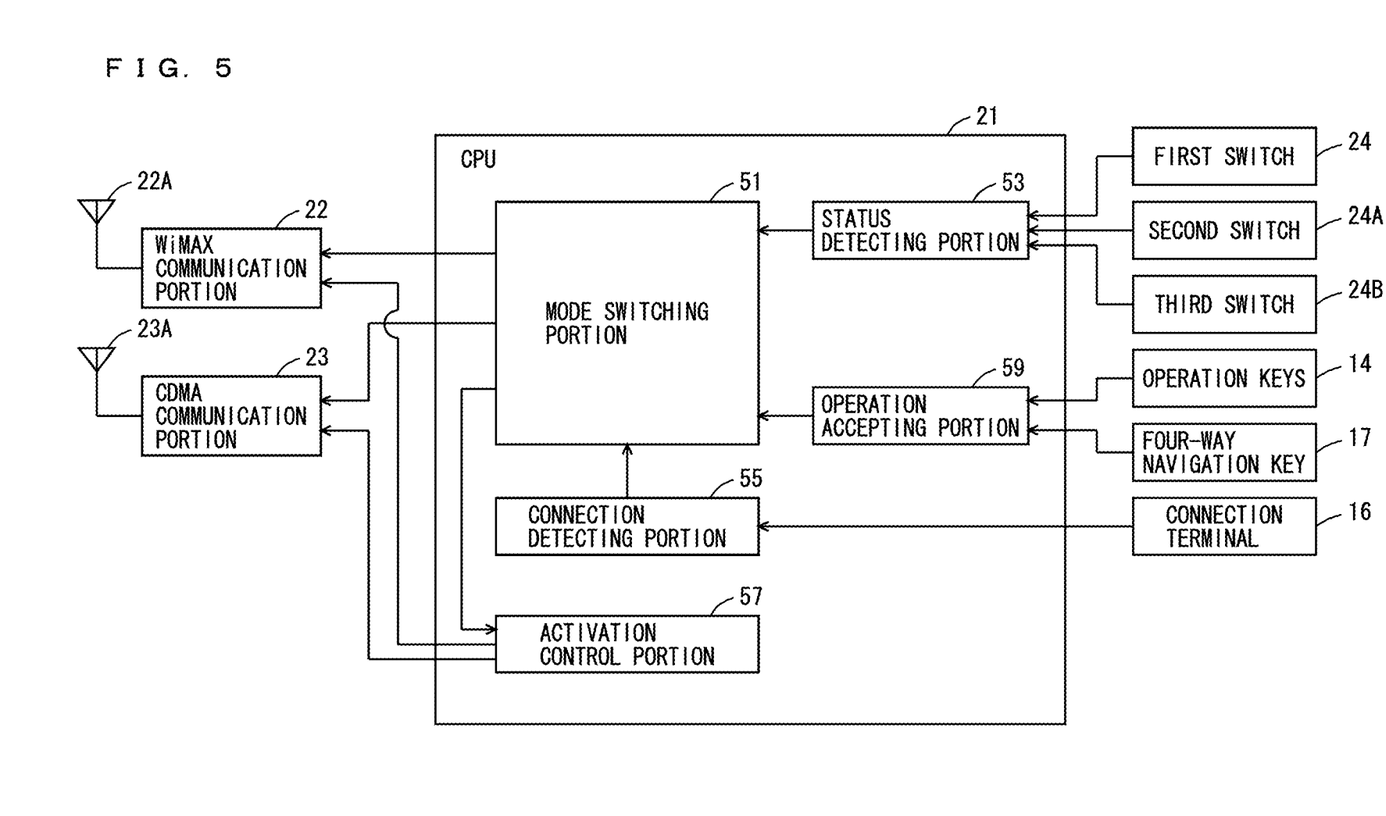
FIG. 5 is a functional block diagram schematically showing the functions of a CPU included in the mobile information terminal according to an embodiment.

FIG. 5 is a functional block diagram schematically showing the functions of the CPU included in mobile information terminal 1 according to the present embodiment. Referring to FIG. 5, CPU 21 includes: a mode switching portion 51 which switches the communication modes of mobile information terminal 1; a status detecting portion 53 which detects a status of mobile information terminal 1; a connection detecting portion 55 which detects a state where earphone microphone 16A is connected; an activation control portion 57 which controls activation of WiMAX communication portion 22 and CDMA communication portion 23; and an operation accepting portion 59 which accepts an operation by a user.

Status detecting portion 53 is connected to first switch 24, second switch 24A, and third switch to detect a status of mobile information terminal 1 on the basis of their states. Status detecting portion 53 detects that mobile information terminal 1 is in the data communication style when first switch 24 is ON, detects that mobile information terminal 1 is in the voice call style when second switch 24A is ON, and detects that mobile information terminal 1 is in the primary style when third switch 24B is ON. Status detecting portion 53 outputs the detected status to mode switching portion 51.

Mode switching portion 51 switches the communication modes in accordance with the status detected by status detecting portion 53. The communication modes include a WiMAX communication mode and a CDMA communication mode. In the WiMAX communication mode, CPU 21 performs communication in the WiMAX communication method. Specifically, CPU 21 transmits and receives data via WiMAX communication portion 22. In the CDMA communication mode, CPU 21 performs communication in the CDMA communication method. Specifically, CPU 21 transmits and receives data via CDMA communication portion 23. In the case where the data communication style is detected by status detecting portion 53, mode switching portion 51 switches the communication mode to the WiMAX communication mode. In the case where the voice call style is detected by status detecting portion 53, mode switching portion 51 switches the communication mode to the CDMA communication mode. Mode switching portion 51 outputs a signal indicating the communication mode after being switched, to activation control portion 57.

Connection detecting portion 55 is connected to connection terminal 16 to detect whether earphone microphone 16A is connected to connection terminal 16. Connection detecting portion 55 outputs to mode switching portion 51 the information on whether earphone microphone 16A is connected.

Operation accepting portion 59 is connected to operation keys 14 or four-way navigation key 17 to accept an operation which is input to operation keys 14 or four-way navigation key 17 by a user.

In the case where status detecting portion 53 detects the data communication style, mode switching portion 51 switches the communication mode to the WiMAX communication mode. In the state where connection detecting portion 55 detects that earphone microphone 16A is connected to connection terminal 16, when a user selects the CDMA communication mode, mode switching portion 51 switches the communication mode to the CDMA communication mode. Specifically, mode switching portion 51 displays a selection screen on LCD 15. Then, when a user uses operation keys 14 or four-way navigation key 17 to issue an instruction to select a communication mode and operation accepting portion 59 accepts the instruction, mode switching portion 51 accepts a signal indicating the selected communication mode from operation accepting portion 59.

Figure 6:
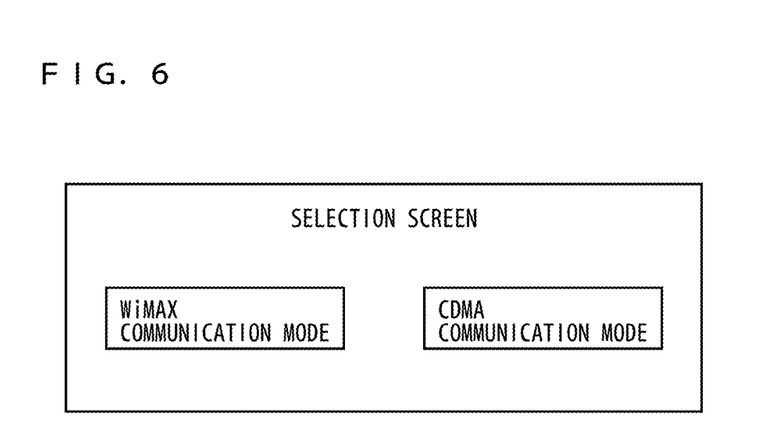
FIG. 6 is a diagram showing an example of a selection screen.

FIG. 6 shows an example of the selection screen. Referring to FIG. 6, the selection screen includes two icons: one having the characters "WiMAX communication mode" displayed thereon, and the other having the characters "CDMA communication mode" displayed thereon. When a user uses operation keys 14 or four-way navigation key 17 to input an operation of selecting the icon having "WiMAX communication mode" displayed thereon, operation accepting portion 59 accepts the instruction to select the WiMAX communication mode. When a user uses operation keys 14 or four-way navigation key 17 to input an operation of selecting the icon having "CDMA communication mode" displayed thereon, operation accepting portion 59 accepts the instruction to select the CDMA communication mode.

Returning to FIG. 5, mode switching portion 51 switches the communication mode to the WiMAX communication mode in receipt of a signal indicating the WiMAX communication mode from operation accepting portion 59, while it switches the communication mode to the CDMA communication mode in receipt of a signal indicating the CDMA communication mode from operation accepting portion 59.

Activation control portion 57 controls activation of WiMAX communication portion 22 in accordance with a signal indicating a communication mode that is input from mode switching portion 51. In the case where a signal indicating the WiMAX communication mode is received from mode switching portion 51, activation control portion 57 activates WiMAX communication portion 22 to make it attain a communicable state. The communicable state refers to a state in which it is linked to an access point or a base-station device. In the case where no signal indicating the WiMAX communication mode is received from mode switching portion 51 (including the case where a signal indicating the CDMA communication mode is received therefrom), activation control portion 57 deactivates WiMAX communication portion 22 to make it unable to communicate. During the CDMA communication mode, WiMAX communication portion 22 consumes no power, whereby power consumption can be decreased.

Furthermore, when mobile information terminal 1 is ON, activation control portion 57 activates CDMA communication portion 23 to make it communicable. Therefore, CDMA communication portion 23 is ready to receive a call while mobile information terminal 1 is ON.

Figure 7:
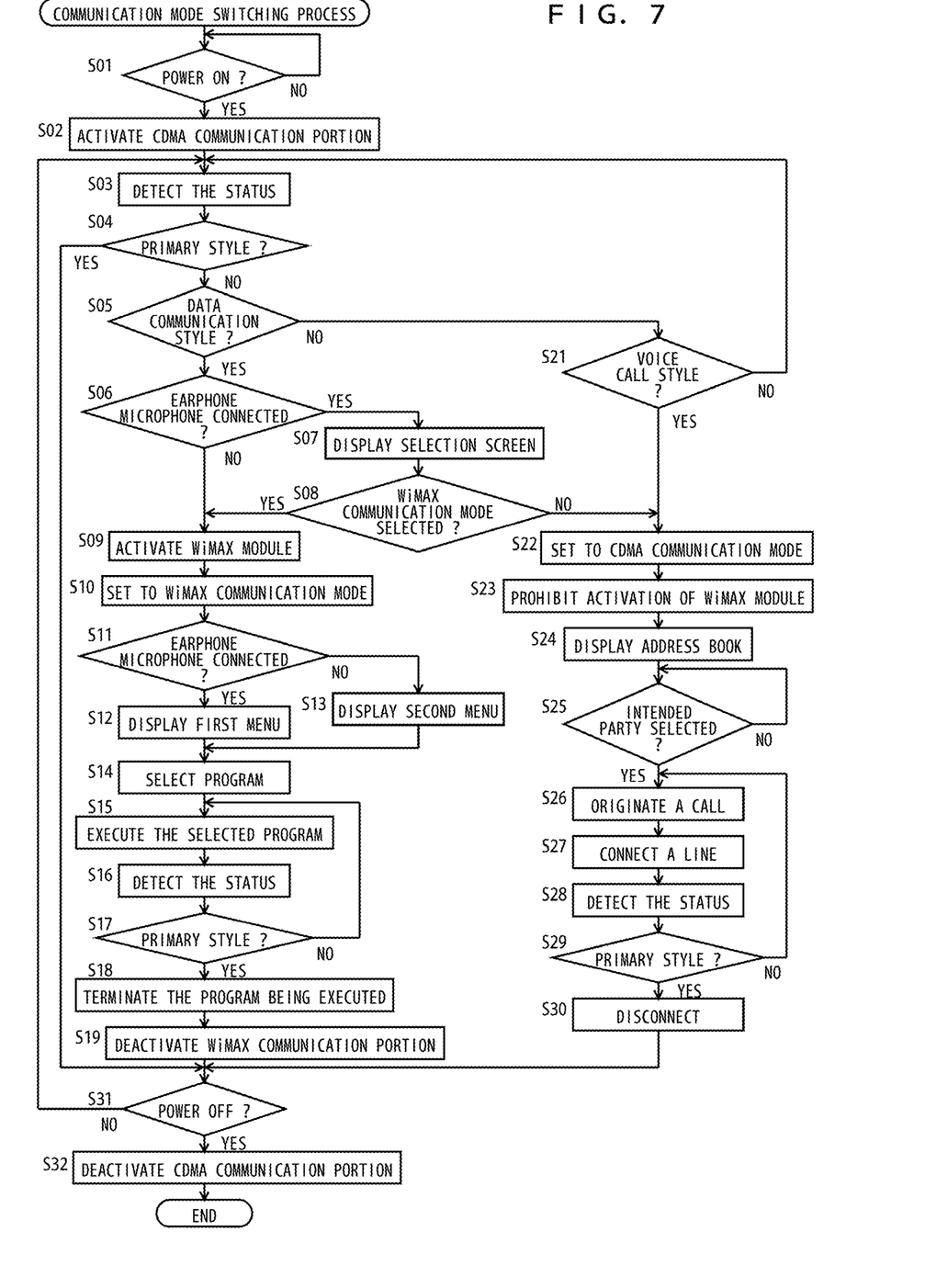
FIG. 7 is a flowchart illustrating an example of the flow of a communication mode switching process.

FIG. 7 is a flowchart illustrating an example of the flow of a communication mode switching process. The communication mode switching process is carried out by CPU 21 as CPU 21 executes a mode switching program. Referring to FIG. 7, in step S01, CPU 21 determines whether power is turned on. CPU 21 is in a standby mode until power is turned on (NO in step S01), and once power is turned on, the process proceeds to step S02. In other words, the mode switching process is a process executed provided that power is turned on.

In step S02, CDMA communication portion 23 is activated. Accordingly, CDMA communication portion 23 becomes communicable and enters a standby state capable of receiving an incoming call.

In the following step S03, the status of mobile information terminal 1 is detected. Then, in step S04, it is determined whether the status detected in step S03 is the primary style. If the detected status is the primary style, the process proceeds to step S31; otherwise, the process proceeds to step S05. In step S05, it is determined whether the status detected in step S03 is the data communication style. If the detected status is the data communication style, the process proceeds to step S06; otherwise, the process proceeds to step S21. That is, when mobile information terminal 1 is in the primary style, processes from step S31 on down are performed. When mobile information terminal 1 is in the data communication style, processes from step S06 on down are performed. When mobile information terminal 1 is in the voice call style, processes from step S22 on down are performed.

The process proceeds to step S06 when mobile information terminal 1 is in the data communication style. In step S06, it is determined whether earphone microphone 16A is connected to connection terminal 16. If earphone microphone 16A is connected to connection terminal 16, the process proceeds to step S07; otherwise, the process proceeds to step S09.

In step S07, the selection screen shown in FIG. 6 is displayed on LCD 15. CPU 21 is in a standby mode until it accepts an instruction to select a communication mode. In step S08, it is determined whether the WiMAX communication mode has been selected by a user. If the WiMAX communication mode has been selected by the user, the process proceeds to step S09; otherwise, the process proceeds to step S22. Therefore, in the state where mobile information terminal 1 is in the data communication style and earphone microphone 16A is connected to connection terminal 16, the user can select whether to use WiMAX communication portion 22 or CDMA communication portion 23.

In step S09, CPU 21 activates WiMAX communication portion 22 to make it communicable. Then, in step S10, CPU 21 sets the communication mode to the WiMAX communication mode. CPU 21 performs communication in the WiMAX communication method while the communication mode is being set to the WiMAX communication mode.

In the following step S11, it is determined whether earphone microphone 16A is connected to connection terminal 16 included in second housing 40B. If earphone microphone 16A is connected to connection terminal 16, the process proceeds to step S12; otherwise, the process proceeds to step S13. In step S12, CPU 21 displays a first menu screen on LCD 15 and waits until one of the menu items included in the first menu screen is selected. In step S13, CPU 21 displays a second menu on LCD 15 and waits until one of the menu items included in the second menu screen is selected.

Figure 8A:
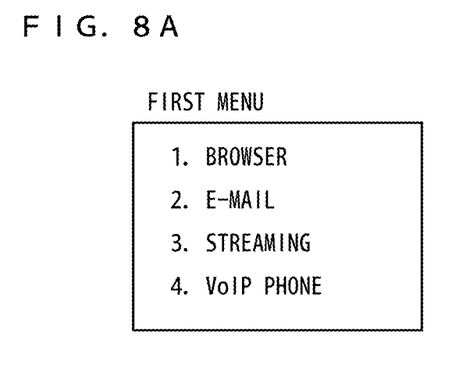
FIG. 8A is a diagram showing an example of a first menu screen.

FIG. 8A shows an example of the first menu screen. Referring to FIG. 8A, the first menu screen includes the menu items of: "1. Browser", "2. E-mail", "3. Streaming", and "4. VoIP phone". When the menu item "1. Browser" is selected, CPU 21 executes a browser program. When the menu item "2. E-mail" is selected, CPU 21 executes a mailer program for editing, transmitting, or receiving e-mail. When the menu item "3. Streaming" is selected, CPU 21 executes a streaming program for receiving and reproducing moving image data or music data. When the menu item "4. VoIP phone" is selected, CPU 21 executes a telephone call program for performing a telephone call using a VoIP communication protocol.

Figure 8B:
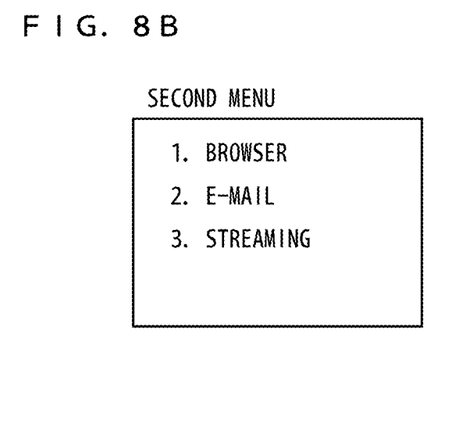
FIG. 8B is a diagram showing an example of a second menu screen.

FIG. 8B shows an example of the second menu screen. Referring to FIG. 8B, the second menu screen includes the menu items of: "1. Browser", "2. E-mail", and "3. Streaming" The second menu screen is different from the first menu screen in that the second menu screen does not include the menu item "VoIP phone". The second menu screen is displayed on LCD 15 in the state where mobile information terminal 1 is in the data communication style and earphone microphone 13 is not connected to connection terminal 16. In this state, mobile information terminal 1 cannot receive a voice input. Accordingly, the menu item "VoIP phone" is prevented from being displayed, so as not to allow execution of the telephone call program for performing a telephone call using the VoIP communication protocol.

Returning to FIG. 7, in step S14, CPU 21 selects a program corresponding to the menu item that was selected by a user from the first menu screen in step S12 or from the second menu screen in step S13 (step S14). Then, it executes the selected program (step S15). In the case where the program executed involves data communication, data is transmitted or received in the WiMAX communication method via WiMAX communication portion 22.

In step S16, the status of mobile information terminal 1 is detected. Then, it is determined whether the detected status is the primary style (step S17). If the detected status is the primary style, the process proceeds to step S18; otherwise, the process returns to step S15. In step S18, CPU 21 terminates the running program. That is, while mobile information terminal 1 is in the data communication style, the application program selected in step S14 is executed, and once mobile information terminal 1 is changed in status to the primary style, the application program being executed is terminated. As such, an operation of changing the status of mobile information terminal 1 from the data communication style to the primary style can terminate the application program. This eliminates the need of a special operation such as a depression of a button or the like, whereby the operation is simplified.

In step S19, WiMAX communication portion 22 is deactivated, and the process proceeds to step S31. This can prevent WiMAX communication portion 22 from wasting power.

On the other hand, in step S22, the communication mode is set to the CDMA communication mode. Then, in step S23, CPU 21 prohibits activation of WiMAX communication portion 22. When WiMAX communication portion 22 is at work, WiMAX communication portion 22 is deactivated. This prevents WiMAX communication portion 22 from wasting power.

In the following step S24, an address book stored in flash ROM 31 in advance is displayed on LCD 15. The address book includes telephone numbers of other parties. In step S25, CPU 21 is in a standby mode until a party to be called is selected (NO in step S25), and once a party to be called is selected (YES in step S25), the process proceeds to step S26.

While it is here assumed that a user selects an intended party from an address book, a communication history may be displayed on LCD 15 to allow a user to select an intended party from the communication history.

In step S26, a call is originated to the party selected in step S25. Then, a line is connected with a mobile phone of the intended party (step S27). Here, the communication mode has been set to the CDMA communication mode, and thus, the line is connected in the CDMA communication method via CDMA communication portion 23 to allow a telephone conversation.

In the following step S28, the status of mobile information terminal 1 is detected. Then, it is determined whether the detected status is the primary style (step S29). If the detected status is the primary style, the process proceeds to step S30; otherwise, the process returns to step S26. In step S30, the line that was connected in step S27 is disconnected, and the process proceeds to step S31. That is, the telephone call is continued while mobile information terminal 1 is in the voice call style, and is terminated when mobile information terminal 1 is changed in status to the primary style. As such, an operation of changing the status of mobile information terminal 1 from the voice call style to the primary style can terminate the telephone call. This eliminates the need of a special operation such as a depression of a button for terminating the call, whereby the operation is simplified.

In step S31, it is determined whether power switch 18 of mobile information terminal 1 has been turned off If power switch 18 has been turned off, the process proceeds to step S32; otherwise, the process returns to step S03. In step S32, CDMA communication portion 23 is deactivated, and the process is terminated.

Hereinafter, operations executed when mobile information terminal 1 receives an incoming call will be described. As described above, CDMA communication portion 23 is active while mobile information terminal 1 is ON, whereas WiMAX communication portion 22 is active only while mobile information terminal 1 is in the WiMAX communication mode. The communication mode of mobile information terminal 1 is switched to the WiMAX communication mode only in the data communication style. This gives rise to a difference between the operation executed when mobile information terminal 1 receives an incoming call in the voice call style and the operation executed when it receives an incoming call in the data communication style.

Figure 9:
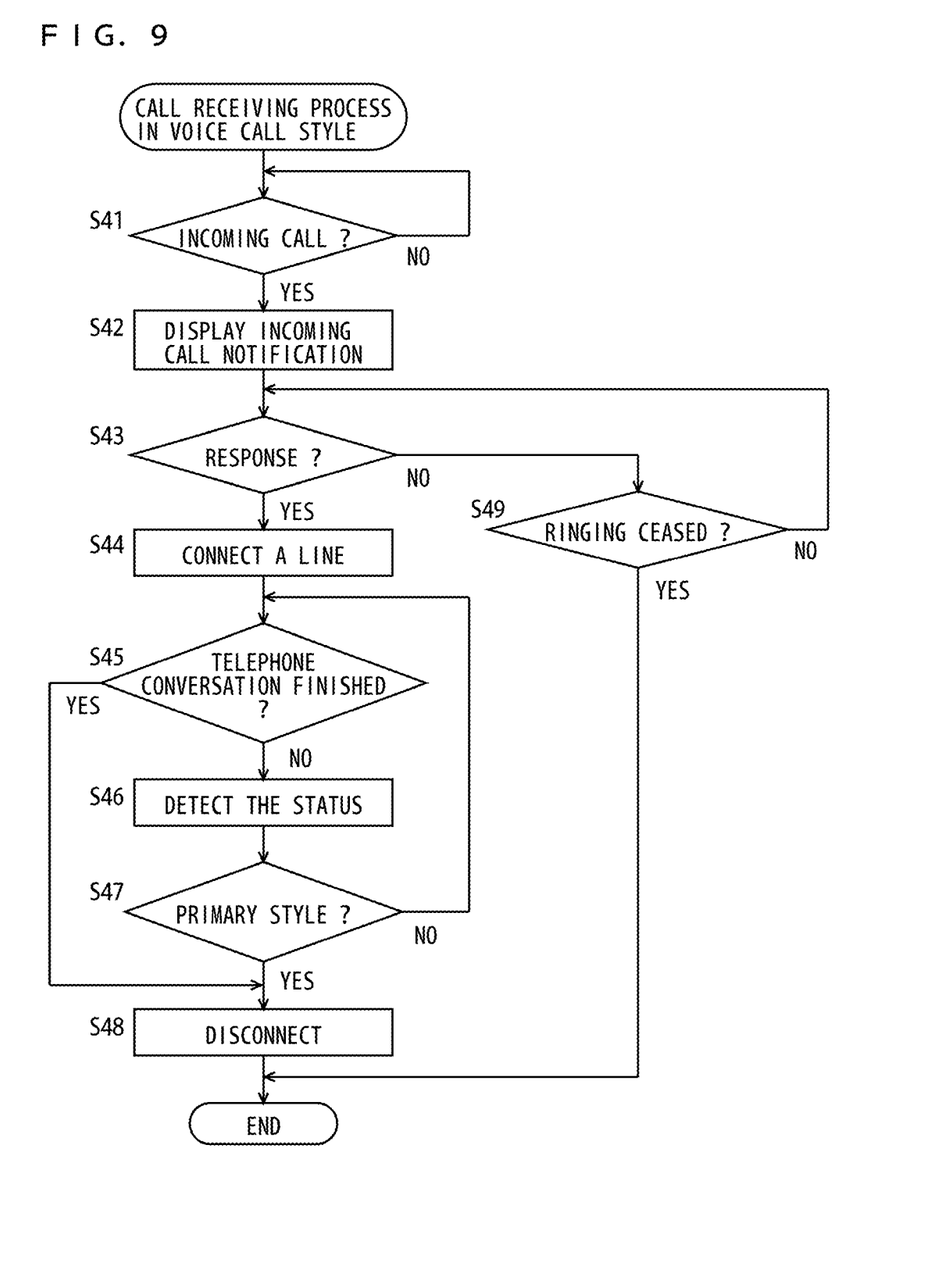
FIG. 9 is a flowchart illustrating an example of the flow of a call receiving process in the voice call style.

FIG. 9 is a flowchart illustrating an example of the flow of a call receiving process in the voice call style. The call receiving process is carried out by CPU 21 as CPU 21 executes a call receiving program. Referring to FIG. 9, in step S41, CPU 21 determines whether an incoming call has been accepted. CPU 21 is in a standby mode until an incoming call is accepted. Once the incoming call is accepted, the process proceeds to step S42. During the state where mobile information terminal 1 is in the voice call style, WiMAX communication portion 23 is not activated. Therefore, it is determined whether CDMA communication portion 23 has received an incoming call.

In step S42, an incoming call notification is displayed on LCD 15. Instead of, or in addition to, the display of the notification on LCD 15, vibration portion 26 may be vibrated or a lamp may be illuminated, for example, for notifying of the incoming call. In the following step S43, it is determined whether a response has been accepted. For example, a response is accepted when four-way navigation key 17 is depressed. If a response has been accepted, the process proceeds to step S44; otherwise, the process proceeds to step S49. In step S49, it is determined whether incoming ringing has ceased. If the incoming ringing has ceased, the process is terminated; otherwise, the process returns to step S43.

In step S44, a line is connected with a mobile phone of the calling party. Here, the communication mode has been set to the CDMA communication mode, and therefore, the line is connected in the CDMA communication method via CDMA communication portion 23.

In the following step S45, it is determined whether the telephone conversation has been finished. If CPU 21 detects that the line that had been connected was disconnected by the mobile phone of the calling party, or that a user has input an operation of depressing a termination key pre-assigned to four-way navigation key 17, it determines that the telephone conversation is over. If it is determined that the telephone conversation is finished, the process proceeds to step S48; otherwise, the process proceeds to step S46.

In the following step S46, the status of mobile information terminal 1 is detected. Then, in step S47, it is determined whether the detected status is the primary style. If the detected status is the primary style, the process proceeds to step S48; otherwise, the process returns to step S45. In step S48, the line that was connected in step S44 is disconnected, and the process is terminated. That is, the call is continued until the telephone conversation is finished or while mobile information terminal 1 is in the voice call style, and the call is terminated when mobile information terminal 1 is changed in status to the primary style. A telephone call is terminated with an operation of changing the status of mobile information terminal 1 from the voice call style to the primary style. This eliminates the need of a special operation such as a depression of a button for terminating the call, thereby simplifying the operation.

Figure 10:
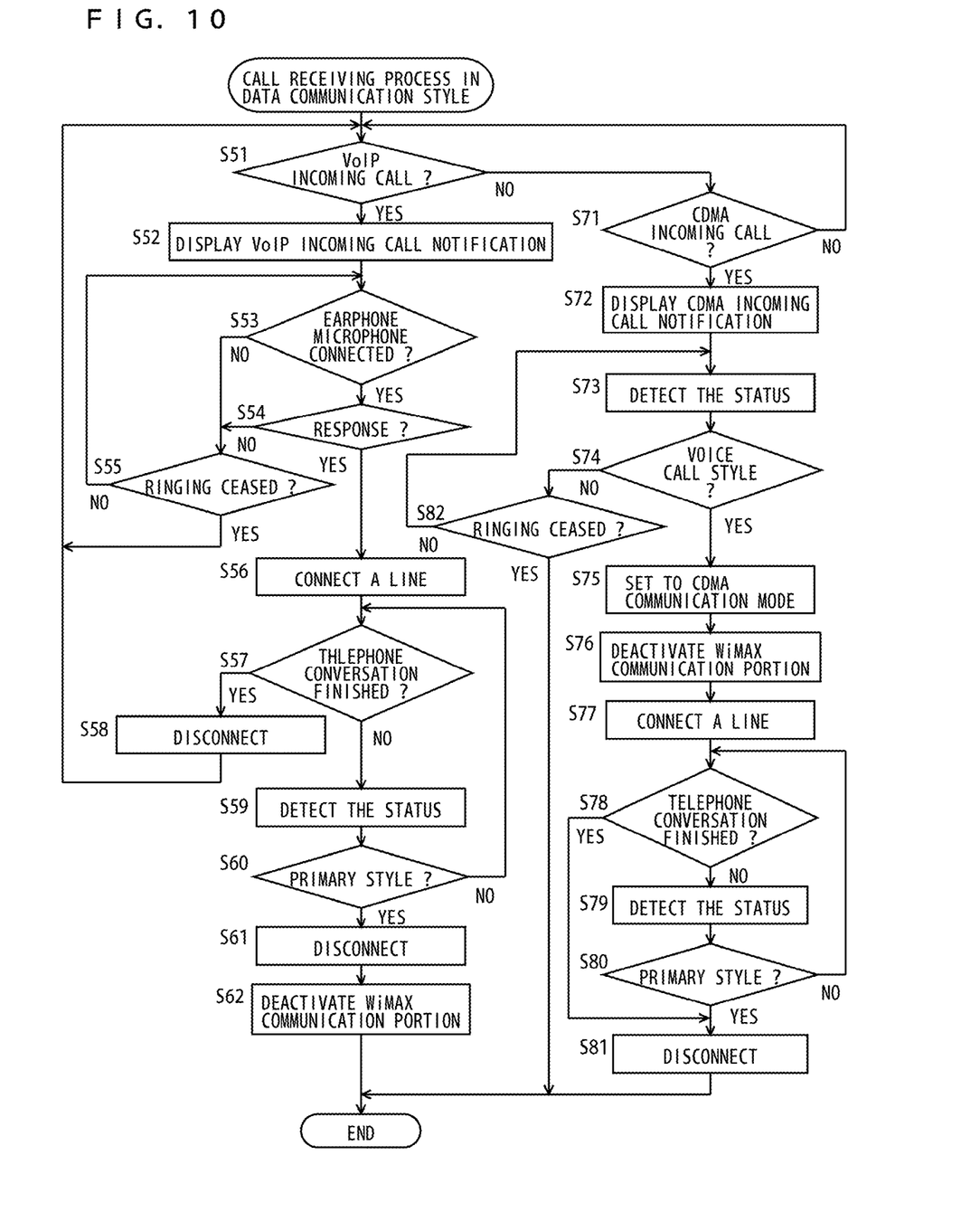
FIG. 10 is a flowchart illustrating an example of the flow of a call receiving process in the data communication style.

FIG. 10 is a flowchart illustrating an example of the flow of a call receiving process in the data communication style. As described above, in mobile information terminal 1 in the data communication style, WiMAX communication portion 22 and CDMA communication portion 23 are activated to be communicable. Thus, in mobile information terminal 1 in the data communication style, both of WiMAX communication portion 22 and CDMA communication portion 23 may receive an incoming call.

Referring to FIG. 10, CPU 21 determines whether a VoIP incoming call has been accepted (step S51). If a VoIP incoming call has been accepted, the process proceeds to step S52; otherwise, the process proceeds to step S71. In the case where WiMAX communication portion 22 has received an incoming call, it is determined that a VoIP incoming call has been accepted. In step S71, it is determined whether a CDMA incoming call has been accepted. If a CDMA incoming call has been accepted, the process proceeds to step S72; otherwise, the process returns to step S51. In the case where CDMA communication portion 23 has received an incoming call, it is determined that a CDMA incoming call has been accepted. Namely, the call receiving process in the data communication style is a process which is executed provided that WiMAX communication portion 22 or CDMA communication portion 23 receives an incoming call.

In step S52, a VoIP incoming call notification is displayed on LCD 15. Then, it is determined whether earphone microphone 16A is connected to connection terminal 16. If earphone microphone 16A is connected, the process proceeds to step S54; otherwise, the process proceeds to step S55. When earphone microphone 16A is connected, a voice input is possible even in the data communication style; a user can use earphone microphone 16A to have a telephone conversation.

In step S54, it is determined whether a response has been accepted. For example, when a depression of four-way navigation key 17 is detected, a response is accepted. If a response has been accepted, the process proceeds to step S56; otherwise, the process proceeds to step S55. In step S55, it is determined whether incoming ringing has ceased. If the ringing has ceased, the process returns to step S51; otherwise, the process returns to step S53. Alternatively, it may be configured such that a line is connected on the condition that connection of earphone microphone 16A is detected. In this case, step S54 is unnecessary.

In step S56, a line is connected to start a VoIP telephone call. Specifically, as the communication mode has been set to the WiMAX communication mode, the line is connected in the WiMAX communication method via WiMAX communication portion 22 to enable a telephone conversation. Then, it is determined whether the telephone conversation has been finished (step S57). When CPU 21 detects that the line that had been connected was disconnected by the mobile phone of the calling party, or that a user has input an operation of depressing a termination key pre-assigned to four-way navigation key 17, it determines that the telephone conversation is over. If it is determined that the telephone conversation is finished, the process proceeds to step S58; otherwise, the process proceeds to step S59. In step S58, the line is disconnected, and the process returns to step S51.

In step S59, the status of mobile information terminal 1 is detected. Then, in step S60, it is determined whether the detected status is the primary style. If the detected status is the primary style, the process proceeds to step S61; otherwise, the process returns to step S57. In step S61, the line that was connected in step S56 is disconnected, and the process proceeds to step S62. That is, the call is continued until the telephone conversation is finished or while mobile information terminal 1 is in the data communication style, and the call is terminated when mobile information terminal 1 is changed in status to the primary style. A telephone call is terminated with an operation of changing the status of mobile information terminal 1 from the voice call style to the primary style. This eliminates the need of a special operation such as a depression of the termination key, whereby the operation is simplified.

In step S62, WiMAX communication portion 22 is deactivated, and the process is terminated. This prevents WiMAX communication portion 22 from wasting power.

On the other hand, the process proceeds to step S72 when CDMA communication portion 23 receives an incoming call. In step S72, a CDMA incoming call notification is displayed on LCD 15. In the following step S73, the status of mobile information terminal 1 is detected. It is then determined whether the detected status is the voice call style (step S74). If it is the voice call style, the process proceeds to step S75; otherwise, the process proceeds to step S82. In step S75, it is determined whether incoming ringing has ceased. If the ringing has ceased, the process is terminated; otherwise, the process returns to step S73. The process is terminated with mobile information terminal 1 remaining in the data communication mode. This allows any application program that has been heretofore executed in the data communication mode to be executed continuously.

In step S75, the communication mode is set to the CDMA communication mode. In the following step S76, CPU 21 deactivates WiMAX communication portion 22. This prevents WiMAX communication portion 22 from wasting power.

The processes in steps S77 to S81 are identical to those in steps S44 to S48, respectively, shown in FIG. 9, and therefore, description thereof will not be repeated here.

In the case where CDMA communication portion 23 receives an incoming call while mobile information terminal 1 is in the data communication style, the communication mode is changed to the CDMA communication mode when mobile information terminal 1 is changed in status from the data communication style to the voice call style. A line is then connected by CDMA communication portion 23. This allows a user to respond to ringing by a simple operation of changing the status of mobile information terminal 1 to the voice call style.

As described above, mobile information terminal 1 of the present embodiment includes first housing 40A, and second housing 40B connected to first housing 40A in a slidable manner Second housing 40B has first part 41 and second part 42 on its surface facing first housing 40A. Mobile information terminal 1 can be changed in status to a data communication style (a first status) in which the first part is exposed to the outside, a voice call style (a second status) in which the second part is exposed to the outside, and a style other than the data communication style or the voice call style. Whether the status corresponds to the data communication style or the voice call style is detected, and a communication mode is switched, on the basis of the detected status, to either a WiMAX communication mode, in which communication is performed using WiMAX communication portion 22, or a CDMA communication mode, in which communication is performed using CDMA communication portion 23. When the status of mobile information terminal 1 is changed, the communication method is switched to the one that is suitable for that status. This eliminates the need for a user to switch the communication method, thereby facilitating the operation of switching the communication methods.

The first part which is exposed to the outside in the data communication style has operation keys 14 for use in inputting characters. This facilitates the character inputting operation. For example, in the case where an application program to be executed in mobile information terminal 1 requires a character input, the communication method can be switched to the one which is suitable for the communication that is established through execution of that application program.

In the data communication style, in the case where earphone microphone 16A is connected to connection terminal 16, the communication mode is switched to one of the MiMAX communication mode and the CDMA communication mode that has been selected by a user, whereas in the case where earphone microphone 16A is not connected, the communication mode is switched to the WiMAX communication mode. For example, when earphone microphone 16A is connected in the data communication style, mobile information terminal 1 can function as a VoIP phone.

When mobile information terminal 1 is set to the CDMA communication mode, WiMAX communication portion 22 is deactivated. This prevents WiMAX communication portion 22 from wasting power, thereby enabling reduction of power consumption.

Furthermore, when mobile information terminal 1 is in the data communication style, WiMAX communication portion 22 and CDMA communication portion 23 are both activated. In the case where a VoIP incoming call is accepted, a telephone conversation via the VoIP communication is enabled by connecting earphone microphone 16A. In the case where a CDMA incoming call is accepted, a telephone conversation via the CDMA communication is enabled by changing the status of mobile information terminal 1 to the voice call style. These can enhance the convenience.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A mobile information terminal comprising:
a first housing;
a second housing connected to said first housing in a relatively movable manner,
    said second housing having a first part and a second part on its surface facing said first housing, the mobile information terminal being changeable in status to a first status in which said first part is exposed to the outside and to a second status in which said second part is exposed to the outside;
status detecting portion to detect whether the mobile information terminal is in said first status or said second status;
first communication portion;
second communication portion different in communication method from said first communication portion;
mode switching portion to switch a communication mode, on the basis of the status detected by said status detecting portion, to either a first communication mode in which communication is performed using said first communication portion or a second communication mode in which communication is performed using said second communication portion;
operation accepting portion to accept an operation by a user; and
a connection terminal to which an earphone microphone can be connected;
wherein in the state where said first status is detected, said mode switching portion switches the communication mode to the mode accepted by said operation accepting portion in the case where the earphone microphone is connected to said connection terminal, and said mode switching portion switches the communication mode to said first communication mode in the case where the earphone microphone is not connected to said connection terminal.

2. The mobile information terminal according to claim 1, wherein said first part has a plurality of buttons for use in inputting characters.

3. The mobile information terminal according to claim 1, further comprising activation control portion to prohibit activation of said first communication portion in the state where said mode switching portion has switched the communication mode to said second communication mode.

* * * * *